United States Patent
Wills

(10) Patent No.: US 11,375,702 B2
(45) Date of Patent: Jul. 5, 2022

(54) KNOT TYING DEVICE

(71) Applicant: Nathanael Wills, Aurora, CO (US)

(72) Inventor: Nathanael Wills, Aurora, CO (US)

( * ) Notice: Subject to any disclaimer, the term of this patent is extended or adjusted under 35 U.S.C. 154(b) by 309 days.

(21) Appl. No.: 16/851,570

(22) Filed: Apr. 17, 2020

(65) Prior Publication Data

US 2020/0337287 A1    Oct. 29, 2020

Related U.S. Application Data

(60) Provisional application No. 62/839,609, filed on Apr. 26, 2019.

(51) Int. Cl.
- A01K 91/04 (2006.01)
- A01K 97/00 (2006.01)
- D03J 3/00 (2006.01)

(52) U.S. Cl.
CPC .............. *A01K 91/04* (2013.01); *A01K 97/00* (2013.01); *D03J 3/00* (2013.01)

(58) Field of Classification Search
CPC ............ A01K 91/04; A01K 97/00; D03J 3/00
USPC ....................... 43/1, 4; 289/1.5, 17
See application file for complete search history.

(56) References Cited

U.S. PATENT DOCUMENTS

| | | | | |
|---|---|---|---|---|
| 2,455,833 A | * | 12/1948 | Trombetta | A61B 17/12013 606/139 |
| 3,326,586 A | * | 6/1967 | Frost | A01K 91/04 289/17 |
| 3,625,556 A | * | 12/1971 | Stromberg | A01K 91/04 289/17 |
| 3,706,466 A | * | 12/1972 | Landry | A01K 91/04 289/17 |
| 4,558,894 A | * | 12/1985 | Detterbeck | H01B 13/01272 140/93 R |
| 4,572,554 A | * | 2/1986 | Janssen | A01K 91/04 289/17 |
| 5,100,415 A | * | 3/1992 | Hayhurst | A61B 17/0469 606/139 |
| 5,197,217 A | * | 3/1993 | Browning | A01K 91/04 43/4 |
| 5,454,821 A | * | 10/1995 | Harm | A61B 17/0469 606/139 |
| 5,536,273 A | * | 7/1996 | Lehrer | A61B 17/12013 606/139 |
| 5,557,874 A | * | 9/1996 | Pietrandrea | A01K 97/00 7/106 |
| 5,562,684 A | * | 10/1996 | Kammerer | A61B 17/0401 606/139 |
| 5,647,616 A | * | 7/1997 | Hamilton | A01K 97/06 289/17 |
| 5,685,037 A | * | 11/1997 | Fitzner | A01K 91/04 7/106 |

(Continued)

*Primary Examiner* — Timothy D Collins
*Assistant Examiner* — Nicholas Leo Seneczko
(74) *Attorney, Agent, or Firm* — Leyendecker & Lemire, LLC

(57) ABSTRACT

A knot tying device is described. Embodiments of the knot tying device can include, but are not limited to, a shaft, a spring, a slide member, an elastomeric member, and a nut. The shaft can include a slot for receiving a fishing line therethrough and trapping the fishing line between the slide member and the elastomeric member of the knot tying device. When the fishing line is secured to the knot tying device, the knot tying device can be implemented to thread the fishing line through and around the fishing line based on a type of knot being tied.

20 Claims, 13 Drawing Sheets

(56) References Cited

U.S. PATENT DOCUMENTS

| | | | |
|---|---|---|---|
| 5,716,368 A * | 2/1998 | de la Torre | A61B 17/0469 606/139 |
| 5,951,067 A * | 9/1999 | High | A01K 91/04 289/17 |
| 6,434,878 B1 * | 8/2002 | Milton | A01K 91/04 289/17 |
| 6,715,804 B2 * | 4/2004 | Beers | A01K 91/04 289/17 |
| 7,144,128 B2 * | 12/2006 | Brauner | A01K 97/00 362/120 |
| 7,261,327 B1 * | 8/2007 | Johnston | A01K 91/04 289/17 |
| 7,334,822 B1 * | 2/2008 | Hines, Jr. | A01K 97/28 289/17 |
| 8,146,286 B2 * | 4/2012 | Wood | A01K 91/04 289/17 |
| 9,433,198 B2 * | 9/2016 | O'Neal | A01K 91/04 |
| 9,743,652 B2 * | 8/2017 | Hodges | A01K 97/00 |
| 9,877,468 B1 * | 1/2018 | Brown | A01K 95/00 |
| 2004/0004355 A1 * | 1/2004 | Beers | A01K 91/04 289/17 |
| 2004/0216360 A1 * | 11/2004 | Holtzhampf | A01K 91/03 43/42.39 |
| 2005/0278865 A1 * | 12/2005 | West | B26B 11/001 7/106 |
| 2010/0066083 A1 * | 3/2010 | High | A01K 91/047 289/17 |
| 2012/0005939 A1 * | 1/2012 | Vandewalle | A01K 91/04 43/4 |
| 2014/0167413 A1 * | 6/2014 | Ross | B65H 69/04 289/1.5 |
| 2015/0327528 A1 * | 11/2015 | O'Neal | D03J 3/00 289/17 |
| 2019/0380322 A1 * | 12/2019 | Hardinge | A01K 95/02 |

* cited by examiner

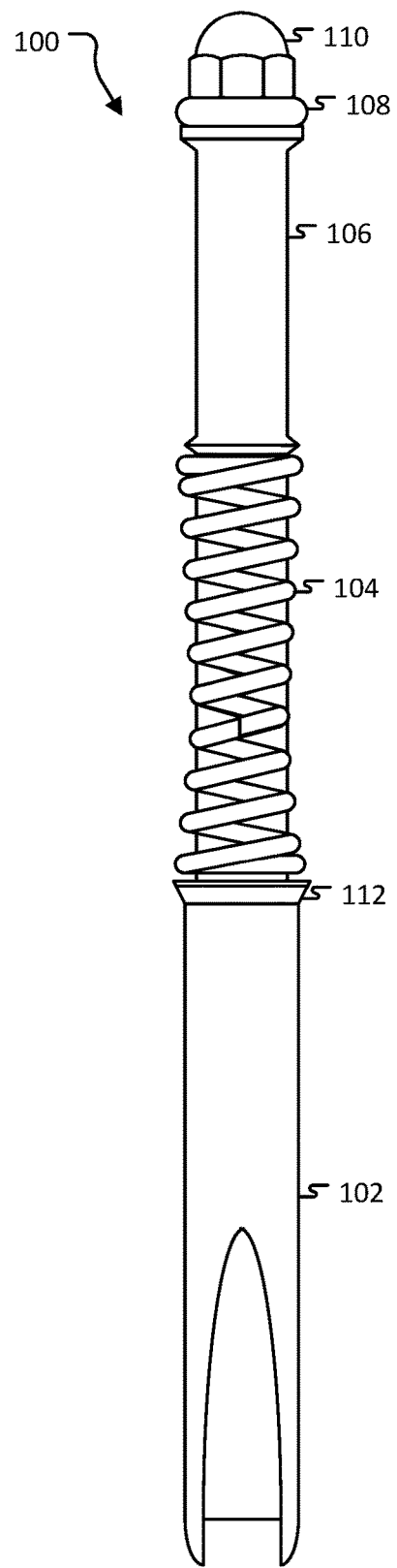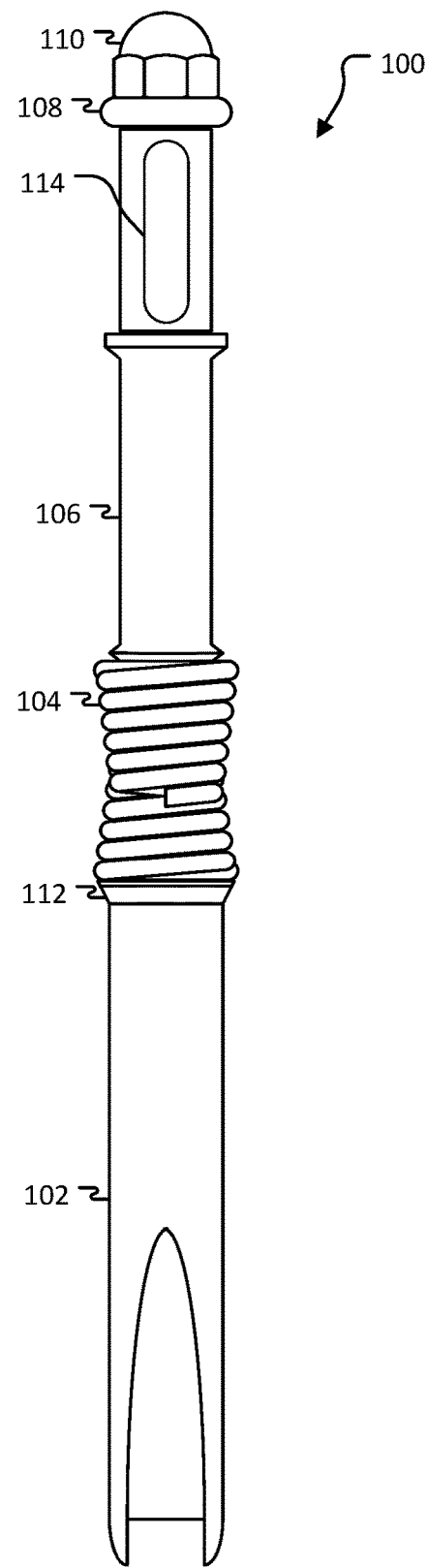
FIG. 1A
FIG. 1B

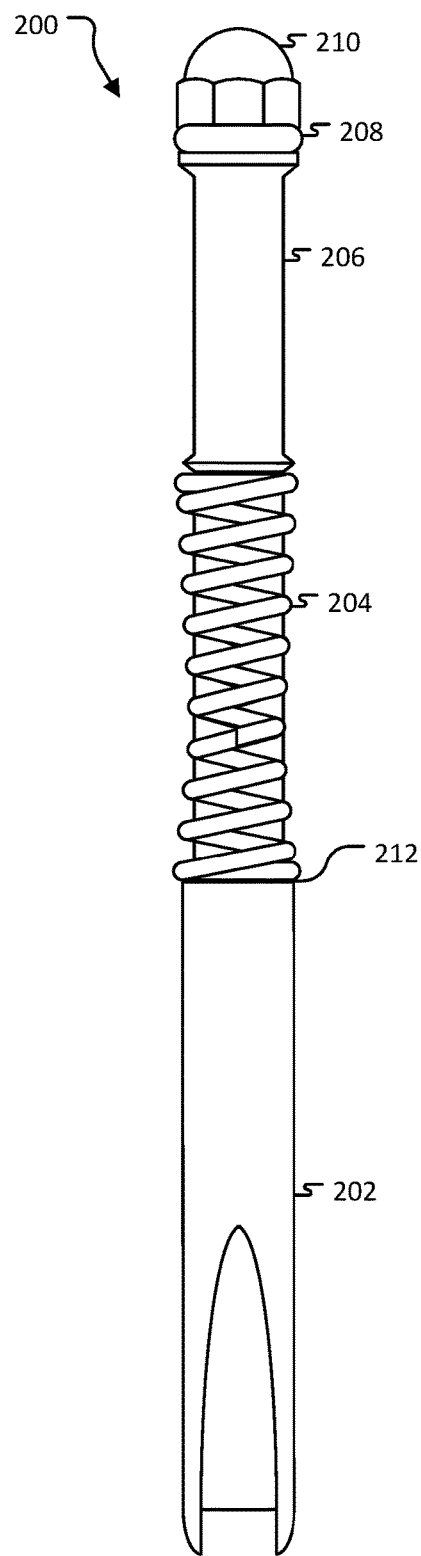
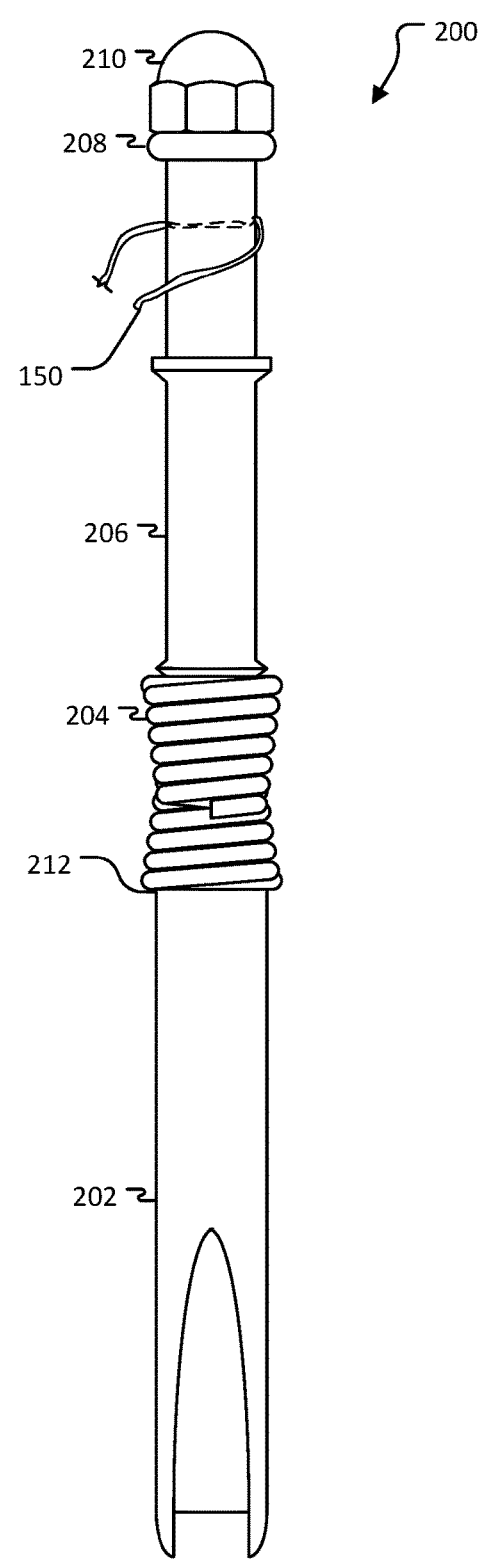
FIG. 11A                    FIG. 11B

KNOT TYING DEVICE

CROSS-REFERENCE TO RELATED APPLICATION

This application claims the benefit of U.S. Provisional Application No. 62/839,609, filed Apr. 26, 2019.

BACKGROUND

Many devices are currently available to help tie a lure to a fishing line. Some devices secure to the hook of the lure to help a user tie a line to the hook. Other devices can include means for securing a line thereto allowing the user to manipulate the line while tying a knot. However, currently available devices do not end the frustration of tying knots from tippet to fly, tippet to tippet rings, or any other fine line or thread. Currently available devices are also limited in their ability to tie a variety of knots (e.g., 20 or more knots) and are usually limited to 5-16 different types of knots. Most devices are designed to be permanently secured to a lanyard or fishing vest limiting a functionality of the devices for tying intricate knots.

Further, currently available devices are only helpful in tying on the terminal fly. If, for instance, an angler is setting up a Rocky Mountain nymph rig, dry-dropper rig, or hopper/dropper rigs, currently available devices provide little help for the lead flies if you want to change them out while keeping the dropper flies in the rig. As can be appreciated, time is wasted when having to remove flies in the rig to attach different flies.

Further, currently available devices lend to wasting fishing line as the devices are not designed to tie a plurality of different knots. In some instances, where the devices are long, they will often kink or bend a fine fishing line when tying intricate knots, thus wasting the fishing line. In such instances, the fishing line is typically damaged or ruined and more fishing line needs to be used. Currently available devices have a bad grip strength to weight ratio where if the device is dropped while tying a knot, the device will typically lose grip of the fishing line and the device will need to be reattached to the fishing line.

As such, a device that can allow an angler to tie a knot regardless of where in the setup the fly is, is needed. Further, a device that can be operated by one hand and that can secure a line while still maintaining a grip when dropped, is needed.

BRIEF DESCRIPTION OF THE DRAWINGS

FIG. 1A is a front view of a knot tying device according to one embodiment of the present invention.

FIG. 1B is a front view of a knot tying device with a slide member moved down according to one embodiment of the present invention.

FIG. 11A is a front view of a knot tying device according to one embodiment of the present invention.

FIG. 11B is a front view of a knot tying device with a slide member moved down according to one embodiment of the present invention.

DETAILED DESCRIPTION

Figure 2A:
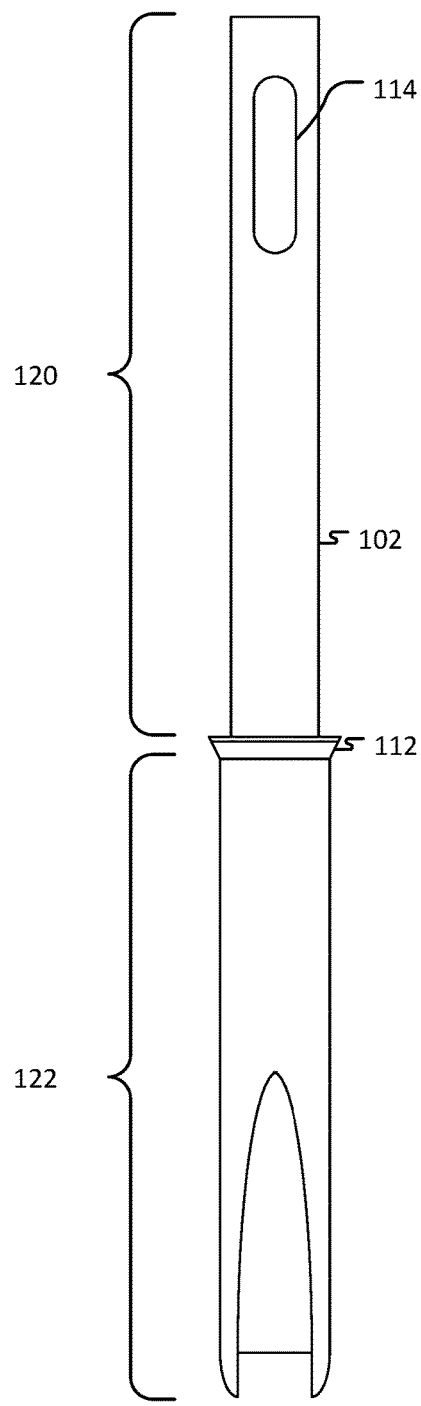
FIG. 2A is a front view of a shaft of a knot tying device according to one embodiment of the present invention.

Embodiments of the present invention include a knot tying device configured to aid a fisherman in tying a plurality of different knots. The knot tying device can typically be implemented when fly fishing, and more particularly, when tying a fly (or fly-fishing lure) to a fishing line. Of note, embodiments of the knot tying device can be used for all types of fishing and is not meant to be limited to fly fishing. For instance, the knot tying device can be implemented to tie a fishing lure to a fishing line of a spincast reel setup. The knot tying device can be sized (e.g., approximately 2 inches long) to be wielded using a single hand while allowing an angler to manipulate a fishing line (or other tool) with their other hand when tying a knot. Since the knot tying device is not typically secured to the person, the angler may weave, wind, thread, etc. the knot tying device through a fishing line when tying a knot, similar to sewing with a needle.

In one embodiment, the knot tying device can include, but is not limited to, shaft, a spring, an elastomeric member, an end stop (e.g., a nut), and a slide member. The shaft can be defined by a first end and a second end, a first portion, a second portion, and a stop located between the first portion and the second portion. The first portion can include the first end and the second portion can include the second end. Typically, the shaft can be manufactured from a rigid material. The spring can be passed over the first end onto the first portion of the shaft and interface with the stop. The slide member can then be passed over the first end onto the first portion and interface with the spring. The slide member may include knurling to enhance a grip of the slide member. The slide member can be pressed against the spring until the spring is almost fully compressed. The elastomeric member may then be passed over the first end to interface with the slide member and the nut can be coupled to the first end. The elastomeric member can include, but is not limited to, an O-ring, grommet, washer, or some rubber equivalent. In one embodiment, a top surface of the slide member can include knurling or a similar effect from another manufacturing process to decrease slippage on the top surface of the slide member. In another embodiment, a top surface of the slide member may include a thin layer of elastomeric material.

In one embodiment, the knot tying device can typically weigh between 2-15 grams when fully assembled. When fully assembled, the knot tying device can be approximately 2-4 inches (~50-100 mm) long. Based on a size and weight of the knot tying device, fishing line is not wasted when tying a plurality of different knots with the knot tying device. For instance, the weight of the knot tying device can ensure that even when dropped, the fishing line will not become ruined by kinking or bending. Further a grip strength of the knot tying device can ensure a fishing line stays engaged to the knot tying device even when the device is dropped. The overall length of the device can allow an angler to easily thread the device through various loops of the fishing line when tying a knot.

In one embodiment, the shaft can include a first end and a second end, a first portion having a first diameter, a stop having a second diameter, and a second portion having a third diameter. The stop can be located between the first portion and the second portion. In some instances, the stop diameter can be the same as the second portion diameter. In some embodiments, the first diameter and the third diameter can be the same. In such an embodiment, the stop diameter can be greater than the first portion diameter and the second portion diameter. The first portion of the shaft can include threads on the first end for mating with the nut. Of note, various types of nuts can be implemented. A cap nut can typically be implemented to provide a smooth end for the device so that the device can easily be inserted into and out of pockets, pouches, etc. As can be appreciated, by having a rounded end, the nut can pass through fishing line without snagging the fishing line when tying a knot.

In one embodiment, the shaft can include a slot located proximate the first end and an upper section of the first portion. The elastomeric member may be coupled to the end stop. The slide member can be configured to cover the slot in a first position. The first position can be a static position where the spring pushes the slide member against the elastomeric member. An angler can move the slide member down to a second position to reveal at least a portion of the slot and pass a fishing line through the slot. The angler may then release the slide member such that the slide member pushes the fishing line up between a top of the slide member and a bottom of the elastomeric member. The fishing line may then be trapped between an upper end of the slide member and a bottom of the elastomeric member.

In another embodiment, the elastomeric member can be coupled to an upper end of the slide member. The elastomeric member and the nut can be implemented to interface with a fishing line. For instance, a fishing line can be trapped between the elastomeric member and a bottom of the nut. To engage the fishing line, an angler can move the slide member down and pass a fishing line at least partially around the exposed shaft. The angler may then release the slide member to allow the elastomeric member to move up and trap the fishing line between a top of the elastomeric member and a bottom of the nut. In some instances, the elastomeric member can be coupled to a bottom of the nut such that the fishing line can be trapped between a bottom of the elastomeric member and a top of the slide member.

Typically, the elastomeric member can be coupled to a bottom of the end stop to allow a top of the slide member to interface with the elastomeric member and an opposite end of the slide member can interface with the spring. The spring can be implemented to push the slide member against the elastomeric member and the end stop. For instance, the spring can be a compression spring. The spring can be located between the stop portion of the shaft and a bottom end of the slide member. When assembled, the slide member can compress the spring such that the slide member can be pushed up against the elastomeric member and the end stop with a constant force from the spring. As can be appreciated, a grip strength of the device can be determined in part by what the compression spring force is and how slip resistant the elastomeric member is.

Embodiments of the knot tying device can be operated with one hand and can be implemented to grip a tippet between the slide member and the elastomeric member. By being able to operate the device with one hand, grip the tippet, and be able to use a short device to tie the knots, the knot tying device can be implemented to tie a variety of different knots in a timely manner. For instance, the knot tying device can be used to tie a Clinch knot in approximately 15 seconds and an Orvis knot in under 15 seconds consistently. With practice, an angler may be able to consistently tie a triple Surgeon's knot in under 20 seconds. As can be appreciated, the knot tying device can be implemented to tie a plurality of different knots including the previously mentioned knots and a uni knot (or slipknot, Duncan Loop knot), Davy knot, etc. Of note, fishing line can include, but is not limited to, a floating fly line, leader, tippet, etc.

In one example implementation, the knot tying device can be implemented to tie a uni knot on a Rocky Mountain nymph rig at a first fly. As can be appreciated, when a uni knot is tied to the bends of a hook on a Rocky Mountain nymph rig, an angler will never have to tie another knot because the angler can slide the knot creating a loop and can remove the down line flies. The angler may then use the knot tying device to secure a different set of flies if the angler has a set of flies rigged.

Embodiments of the knot tying device can be configured to be modular. For instance, components of the device can be swapped for different components having different sizes, shapes, and/or compressive strength. As previously mentioned, the slide member, spring, and elastomeric member can be located between the end stop and the shaft stop of the shaft. As can be appreciated, in embodiments where a nut is implemented as the end stop, the nut can be removed from the first portion of the shaft and allow for the nut, the elastomeric member, the slide member, and/or the spring to be replaced with a variation of said component being replaced. In one example, a spring having a high compressive strength (or compression strength) can be replaced with a spring having a lower compressive strength. By implementing a spring with a lower compressive strength, a user can more easily move the slide member. For instance, an elderly angler or angler with less dexterity (e.g., an angler with a physical disability) may find it easier to use the device with a low compressive strength spring. In another example, the slide member and elastomeric member can be replaced with a slide member having a longer length. By implementing a longer length slide member, the spring can be put under more compression making it harder to move the slide member, and thus increasing a potential grip strength of the device. Alternatively, a spring having lower compressive strength can be implemented with a longer slide member to provide a device that is easy to manipulate while still providing good grip strength to a fishing line.

In one embodiment, the second portion of the shaft, which can include the second end of the shaft, can include a forked end with a ramped groove between the fork. An end of the ramped groove located between the forked end can include a face that is perpendicular to a longitudinal axis of the shaft. Typically, the forked end can be an integral part of the shaft. For instance, the forked end may be machined. The forked end can be implemented to facilitate tying a variety of different knots for coupling one fishing line to another fishing line. For instance, the forked end can be implemented to tie a Nail knot, a Uni knot, and a double Uni knot. In some embodiments, the forked end can include a cap or similar covering to protect an angler when they are not using the second end. For example, a vinyl threaded rod cap can be implemented. Other caps are contemplated and not outside a scope of the present invention.

As previously mentioned, in some embodiments the elastomeric member can be coupled to the slide member or the end stop. Typically, an adhesive can be implemented to couple the elastomeric member to either the slide member or the end stop. It is to be appreciated that other means of coupling the elastomeric member to the slide member or end stop are contemplated and not outside a scope of the present invention.

In one instance, the elastomeric member can be a rubber O-ring. In another instance, the elastomeric member can be a rubber washer. Of note, although rubber is mentioned, a variety of different elastomeric materials may be implemented.

In a typical implementation, the knot tying device can be implemented to secure a lure to a fishing line. In a first step, a user can pass a fishing line through an eye of a hook. Of note, an angler may secure the hook of the lure to the knot tying device and then thread the fishing line through the eye of the hook.

In a second step, the fishing line can then be trapped between the slide member and the elastomeric member (or elastomeric member and end stop). To secure the fishing line to the device, a user can pull the slide member back against the compression spring and pass a fishing line through the exposed slot of the shaft. The user may let go of the slide member or reduce a pushing force such that the slide member slides back and the top of the slide member engages the fishing line pushing the fishing line up against the bottom of the elastomeric member. As can be appreciated, the fishing line may be trapped between a top of the slide member and a bottom of the elastomeric member.

After the fishing line is secured to the device, a user may then begin tying the secured fishing line to a lure or another fishing line. Of note, based on the length and weight of the device, a user may thread the device through and around the fishing line, similar to a needle when sewing, when tying a knot.

In some instances, the knot tying device can act as a fly holder while an angler is threading a fly. In such an instance, an angler can secure a hook of the fly to the knot tying device. In one example, the slide member can be moved down and then a hook of the fly may be wrapped around the shaft with the slide member being released and trapping the hook between the slide member and the elastomeric member. In instances where a hook of the fly is too small to fit around the shaft, the bend in the hook may be pressed against the shaft and the slide member may be released to trap the hook between the slide member and the elastomeric member. The angler may then thread the line through an eyelet of the fly. The angler may then release the hook from the knot tying device and secure the line to the knot tying device before proceeding to tie the knot. As can be appreciated, this may save on lost flies because an angler can quickly transfer the line to the knot tying device after threading the line through the eyelet of the fly. This can "lock" the fly in the line if for some reason the angler loses grip of the line, the fly is still secured from falling off the line because the knot tying device blocks the fly from falling off.

Of significant note, when tying a clinch knot to a bend of a hook for dropper rigs, the knot comes off the bend when an angler is trying to cinch the knot down in a large percentage of instances. The knot tying device can be implemented to negate the currently available issues when tying a clinch knot to a bend of a hook. The knot tying device can be secured to the line and can all but eliminate the frustration of the knot becoming undone since the knot tying device can keep tension on the bend of the hook so the line does not slip off while tying the clinch knot to a hook. The knot tying device can keep tension since an angler can release their grasp of the device and let the device dangle while being secured to the fishing line. Of note, the hook can be oriented upright (e.g., making a "J") to achieve the noted benefits.

Embodiments of the knot tying device are contemplated where the elastomeric member is not included. For instance, a top of the slide member may include knurling or similar and a bottom of the end stop can include knurling or similar. As can be appreciated, the knurling on each surface may provide enough grip of a fishing line to adequately implement the knot tying device to tie a plurality of knots.

One embodiment of the knot tying device can include, but is not limited to, a shaft, a compression spring, a slide member, an elastomeric member, and an end stop. The shaft can be defined by a first end and a second end, a first portion, a second portion, and a shaft stop located between the first portion and the second portion. The compression spring can be adapted to slide over the first portion and interface with the shaft stop. The slide member can be adapted to slide over the first portion and interface with the compression spring. The elastomeric member can be adapted to slide over the first portion and interface with the slide member. The end stop can be coupled to the first end and can be adapted to interface with the elastomeric member.

Another embodiment of the knot tying device can include, but is not limited to, a shaft, a compressing spring, a slide member, an elastomeric member, and a nut. The shaft can be defined by a first portion having a first diameter, a second portion having a second diameter, and a slot located in an upper section of the first portion. The compression spring can fit over the first portion and can have a bottom end interfacing with a top of the second portion. The slide member can fit over the first portion and can have a bottom end interfacing with a top end of the compression spring. The elastomeric member can fit over the first portion and can have a bottom end interfacing with a top end of the slide member. The nut can be removably coupled to a top end of the shaft and can have a bottom end interfacing with a top end of the elastomeric member.

One embodiment of implementing a knot tying device can include, but is not limited to, (i) providing a knot tying device, the knot tying device including (a) a shaft being defined by a first portion having a first diameter, a second portion having a second diameter, and a slot located in an upper section of the first portion, (b) a compression spring fit over the first portion and having a bottom end interfacing with a top of the second portion, (c) a slide member fit over the first portion and having a bottom end interfacing with a top end of the compression spring, (d) an elastomeric member fit over the first portion and having a bottom end interfacing with a top end of the slide member, and (e) a nut removably coupled to a top end of the shaft and having a bottom end interfacing with a top end of the elastomeric member, (ii) moving the slide member from a first position to a second position, (iii) inserting a fishing line through the slot, (iv) moving the slide member from the second position back to the first position and trapping the fishing line between the slide member and the elastomeric member, and (v) using the knot tying device to tie a knot with the fishing line.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

A First Embodiment of a Knot Tying Device

Referring to FIGS. 1A-1B, detailed diagrams of a first embodiment 100 of a knot tying device is illustrated. The knot tying device 100 can be implemented to aid an angler in tying a plurality of different knots while fishing. The knot tying device 100 can be easily stored and is small enough to easily thread through various fishing lines while tying a knot.

As shown, the knot tying device 100 can include, but is not limited to, a shaft 102, a spring 104, a slide member 106, an elastomeric member 108, an end stop 110, and a shaft stop 112. The shaft 102 may include a slot 114 located proximate an upper section of the shaft 102, as shown in FIG. 1B. The spring 104 may be passed over a top end of the shaft 102 and slide down the shaft 102 to the shaft stop 112. The slide member 106 may then be passed over the top end of the shaft 102 and slide down to the spring 104. The elastomeric member 108 may then be passed over the top end of the shaft 102. Of note, the spring 104 will typically need to be slightly compressed to fit each of the components onto the shaft 102 before the end stop 110 is coupled to the top end of the shaft 102.

Generally, a combined length of the spring 104 and the slide member 106 can be greater than a length of the shaft 102 from the shaft stop 112 to the top end. This can help ensure that the spring 104 can be partially compressed when the knot tying device 100 is assembled to provide a constant force against the elastomeric member 108. In one embodiment, the end stop 110 can be a nut removably coupled to the shaft 102. In another embodiment, the end stop 110 may be more permanently coupled to the end of the shaft 102 after the other components have been passed over the shaft 102. For instance, a washer may be welded or adhesively bonded to the end of the shaft 102. Of note, by implementing a removably coupled nut, components of the knot tying device 100 may be swapped with variations of the components to make the device 100 modular. An individual may then tailor components of the device 100 to best suit them. For instance, a spring with a higher compressive strength may be implemented to provide a better grip strength of the device 100.

Referring to FIG. 1A, the slide member 106 is shown in a first position with the slide member 106 pressed against the elastomeric member 108. Referring to FIG. 1B, the slide member 106 is shown in a second position where the slide member 106 can be moved downwardly, further compressing the spring 104, to show the slot 114. In the second position, a fishing line may be passed through the slot 114 and the slide member 106 can be released (or slowly moved upwards) to engage the fishing line between a top of the slide member 106 and a bottom of the elastomeric member 108. A bottom of the spring 104 can interface with the shaft stop 112 and a top of the spring 104 can interface with a bottom of the slide member 106. The spring 104 can be implemented to provide an upward force to the slide member 106 to press against the bottom of the elastomeric member 108. Typically, a surface area of a top of the slide member 106 can be approximately similar to a surface area of a bottom of the elastomeric member 108. As can be appreciated, this can help ensure maximum grip of a fishing line trapped between the two components. The force provided by the spring 104 can be used to secure a fishing line to the knot tying device 100. As can be appreciated, springs having different compressive strengths can be implemented.

Figure 2B:
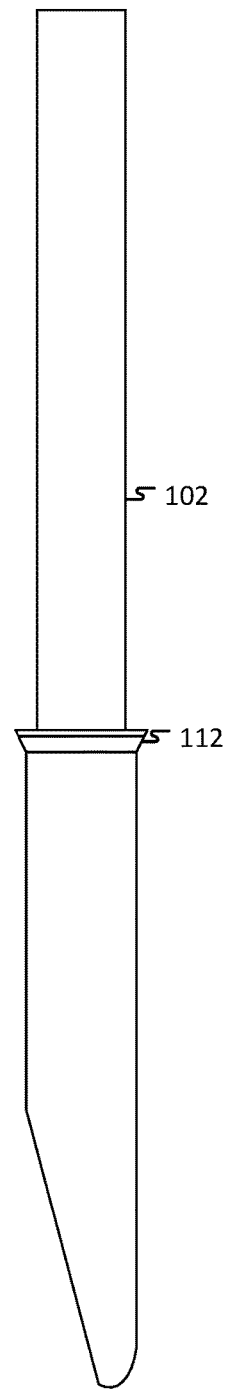
FIG. 2B is a side view of a shaft of a knot tying device according to one embodiment of the present invention.
Figure 2C:
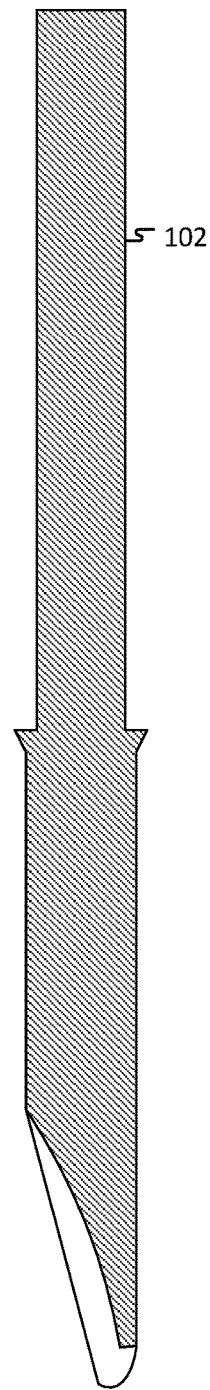
FIG. 2C is a cross-sectional view of a shaft of a knot tying device according to one embodiment of the present invention.

Referring to FIGS. 2A-2C, a front view, a side view, and a cross-sectional view of the shaft 102 are illustrated. As shown, the shaft 102 can include a first portion 120 and a second portion 122. The shaft stop 112 can be located between the first portion 120 and the second portion 122. In some instances, the second portion 122 may have a larger diameter than the first portion 120. In such an instance, the second portion 122 can act as the shaft stop. The spring 104, the slide member 106, the elastomeric member 108, and the nut 110 can interface with the first portion 120 of the shaft 102. Of note, the shaft 102 illustrated in FIGS. 2A-2C is for illustrative purposes only and is not meant to be limiting. For instance, embodiments are contemplated where the first portion 120 and the second portion 122 of the shaft 102 have the same diameter, different diameters, and/or are coupled together.

Typically, the shaft 102 can be machined from a single piece of rigid material. For example, the shaft 102 may be manufactured from a single stock of brass. In another instance, the shaft 102 can be cast. In yet another instance, the shaft 102 may be manufactured from a rigid plastic via a plastic manufacturing process. For example, the shaft 102 may be manufactured with a rigid plastic via 3-D printing, injection molding, or other plastic manufacturing processes. In yet another instance, the shaft 102 may comprise two or more components coupled together. For example, the first portion 120 may be threadably coupled to the shaft stop 112 and the second portion 122. It is to be appreciated that other means of manufacturing are contemplated for making the shaft 102. In some embodiments, the second portion 122 of the shaft 102 may not include the forked end. In such an embodiment, the second end of the shaft 102 can typically have a round end to help ensure a fishing line does not become caught on the shaft 102.

Described hereinafter is one example embodiment of the knot tying device 100 and dimensions for the example embodiment. The first portion 120 may be approximately 37 mm long, the shaft stop 112 may be approximately 2 mm long and have an approximately 5 mm diameter at a widest part, the second portion 122 may be approximately 23 mm long, the forked end may be approximately 9.5 mm, the slot 114 may be approximately 6 mm long and approximately 2 mm wide, a diameter of the first portion 120 may be approximately 3 mm, a diameter of the second portion 122 may be approximately 4 mm, and a threaded end of the shaft 102 may be approximately 3 mm long.

In another example embodiment of the knot tying device 100, the first portion 120 may be approximately 36 mm long, the second portion 122 may be approximately 23 mm long, the shaft stop 112 may be 2 mm long, the first portion 120 and the second portion 122 may each have a diameter of approximately 3.2 mm, the forked end may be 8 mm long, the shaft stop 112 may have a maximum diameter of approximately 4.8 mm, and a threaded end of the shaft 102 may be approximately 3.9 mm long.

Figure 3A:
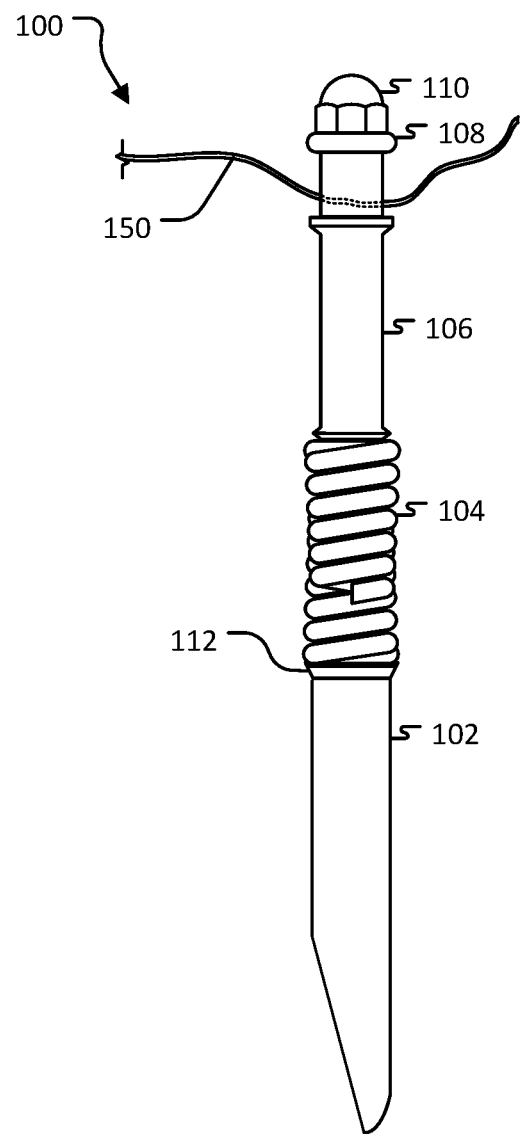
FIG. 3A is a side view of a fishing line passing through a slot of a knot tying device according to one embodiment of the present invention.
Figure 3B:
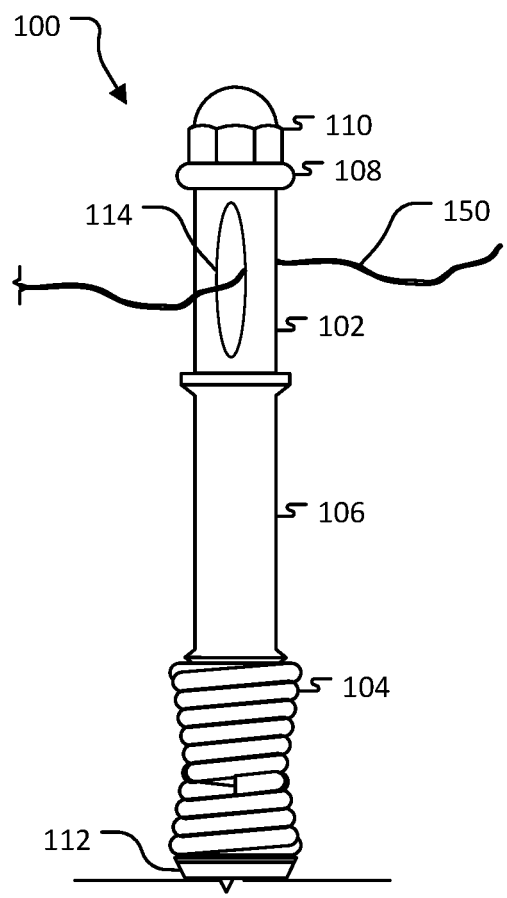
FIG. 3B is a close-up perspective view of a fishing line passing through a slot of a knot tying device according to one embodiment of the present invention.
Figure 3C:
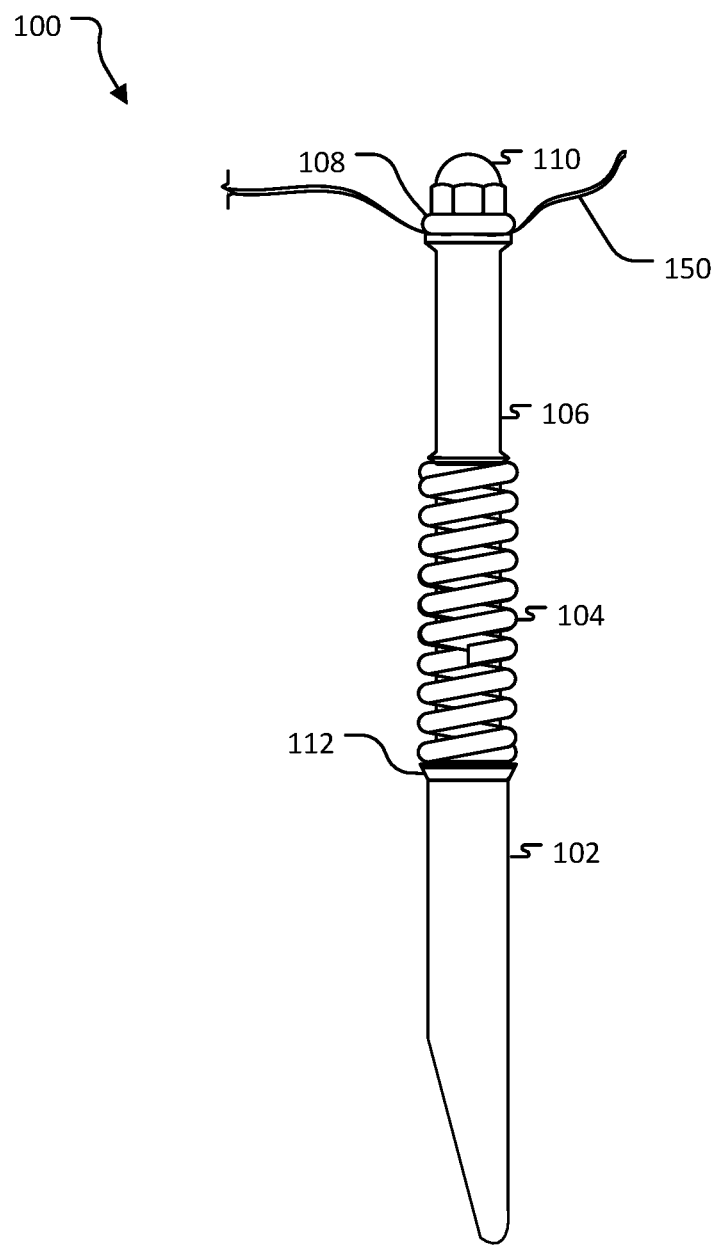
FIG. 3C is a side view of a fishing line being sandwiched between a slide member and an elastomeric member of a knot tying device according to one embodiment of the present invention.
Figure 4A:
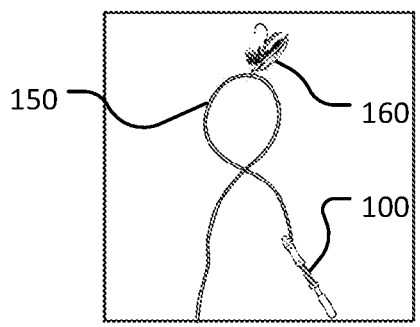
FIGS. 4A-4D include illustrative steps for tying a Davy Knot with a knot tying device according to one embodiment of the present invention.
Figure 4B:
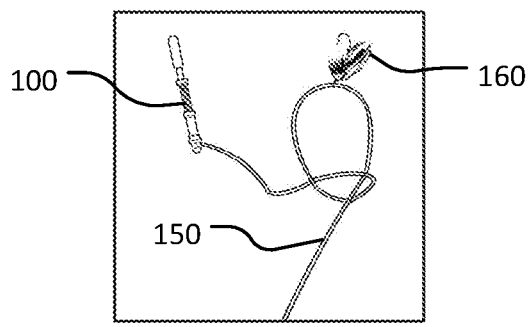
Figure 4C:
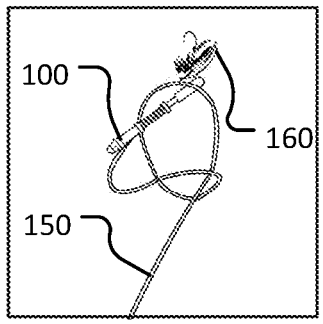
Figure 4D:
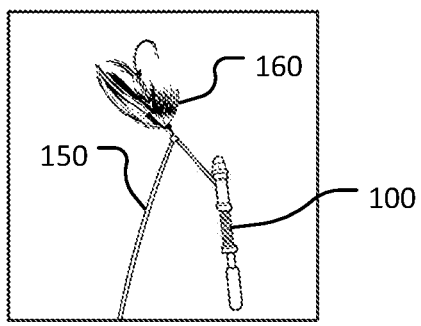
Figure 5A:
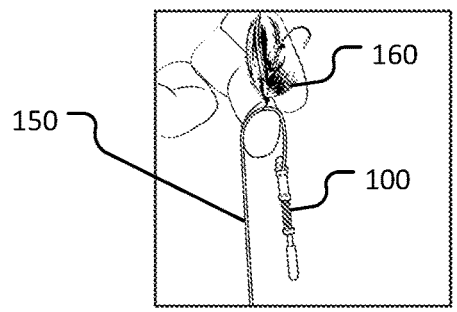
FIGS. 5A-5F include illustrative steps for tying an Improved Clinch Knot with a knot tying device according to one embodiment of the present invention.
Figure 5B:
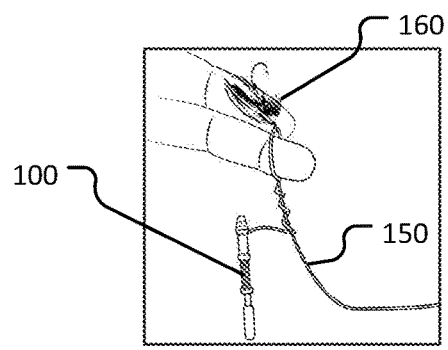
Figure 5C:
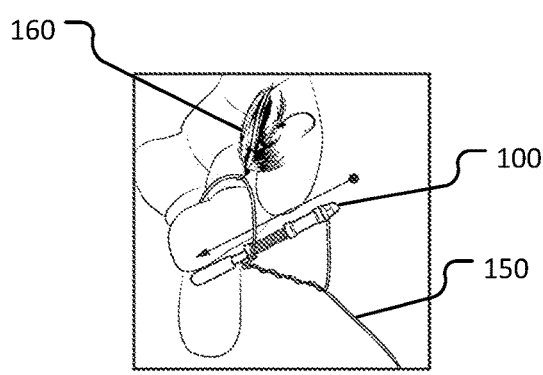
Figure 5D:
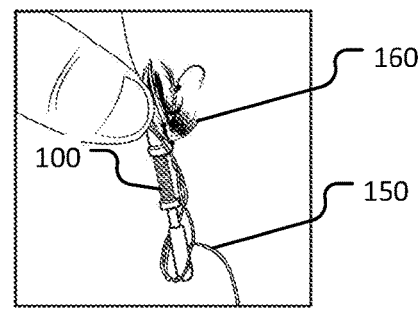
Figure 5E:
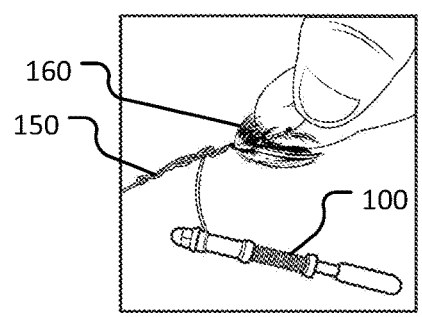
Figure 5F:
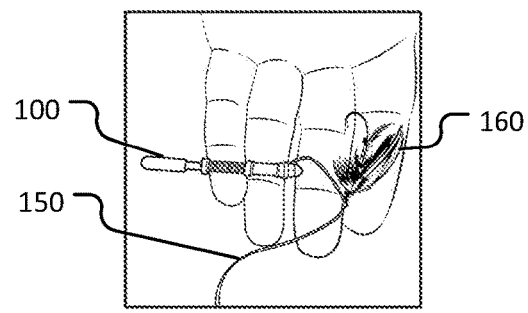
Figure 6A:
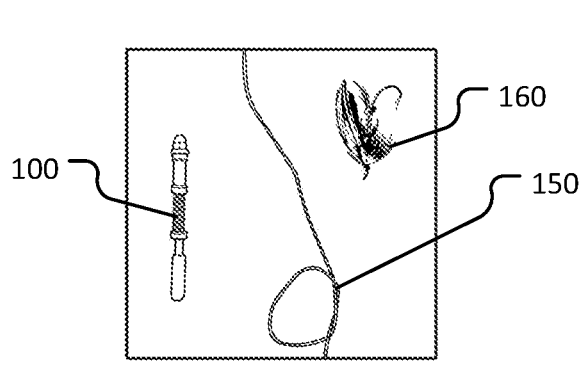
FIGS. 6A-6E include illustrative steps for tying a Non-Slip Loop with a knot tying device according to one embodiment of the present invention.
Figure 6D:
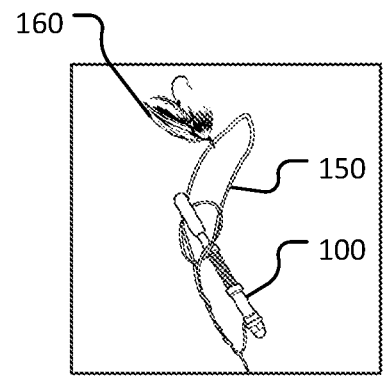
Figure 6B:
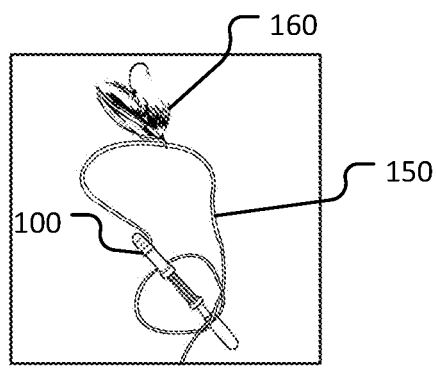
Figure 6E:
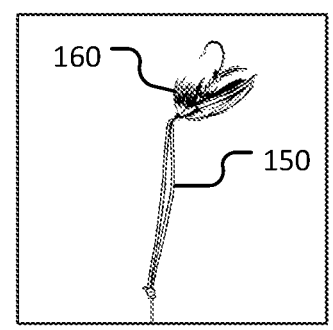
Figure 6C:
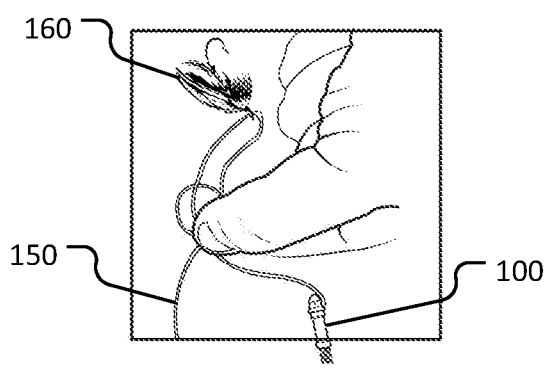
Figure 7A:
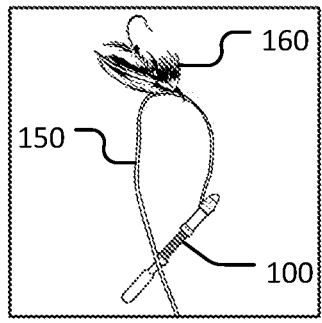
FIGS. 7A-7E include illustrative steps for tying an Orvis Knot with a knot tying device according to one embodiment of the present invention.
Figure 7D:
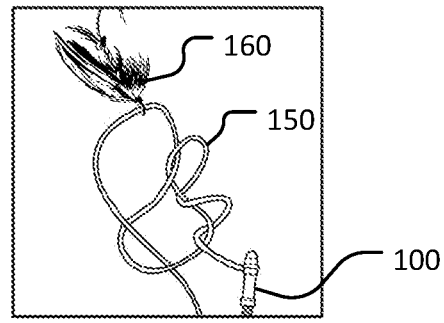
Figure 7B:
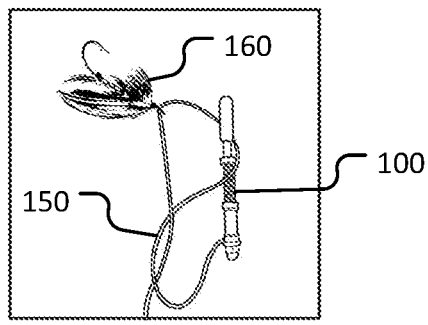
Figure 7E:
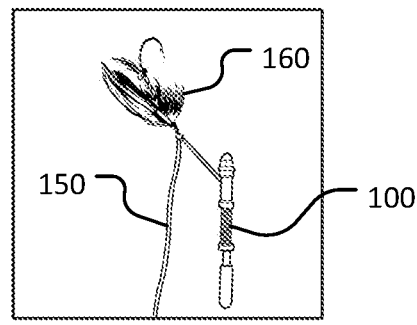
Figure 7C:
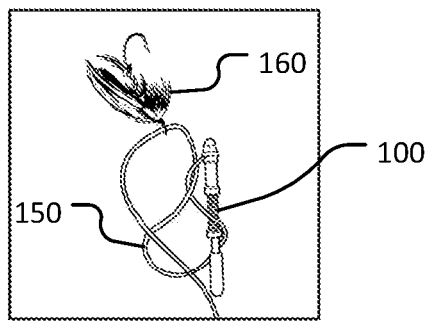
Figure 8A:
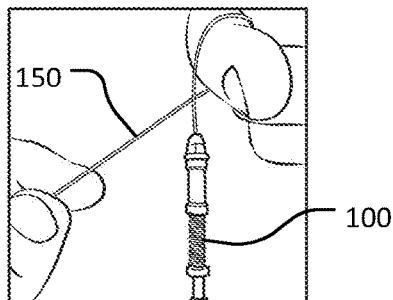
FIGS. 8A-8F include illustrative steps for tying a Perfection Loop with a knot tying device according to one embodiment of the present invention.
Figure 8D:
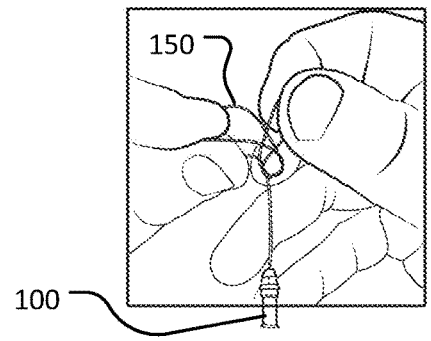
Figure 8B:
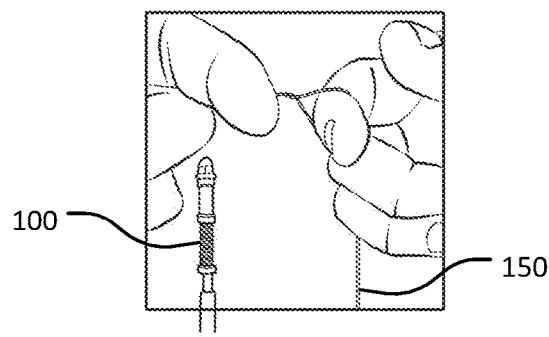
Figure 8E:
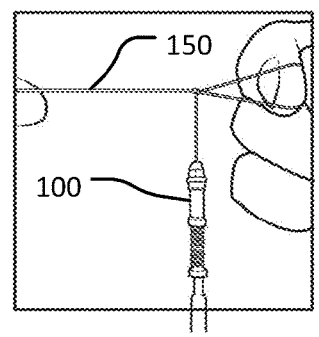
Figure 8C:
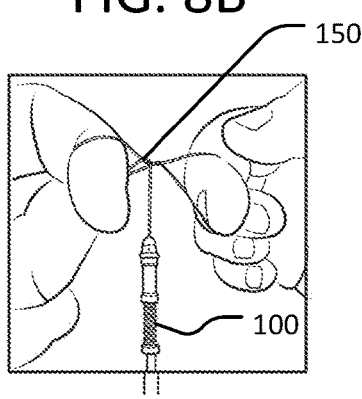
Figure 8F:
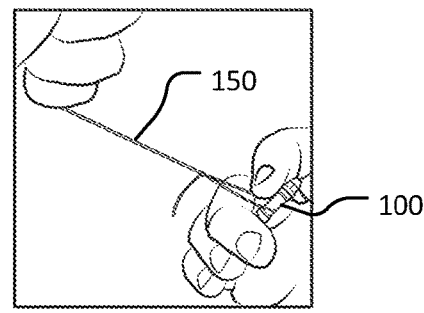

Referring to FIGS. 3A-3C, various views of the knot tying device 100 interfacing with a fishing line 150 are illustrated. FIG. 3A is a side view of the slide member 106 in the second position with the fishing line 150 passing through the slot 114 of the shaft 102. As shown, the spring 104 can be further compressed when the slide member 106 is moved down to the second position. Of note, an angler would need to keep a constant force on the slide member 106 and the spring 104 to keep the slide member 106 in the second position. FIG. 3B is a perspective view of the slide member 106 in the second position and the fishing line 150 passing through the slot 114. In some instances, the fishing line 150 may be partially wrapped around the exposed shaft 102 in lieu of passing through the slot 114. The fishing line 150 may still be pinned between the slide member 106 and the elastomeric member 108. FIG. 3C is a side view of the slide member 106 in the first position pinning the fishing line 150 between a top of the slide member 106 and a bottom of the elastomeric member 108. As shown, the fishing line 150 can be trapped between the slide member 106 and the elastomeric member 108. The spring 104 can be provide a constant force pushing the slide member 106 against the elastomeric member 108 and the nut 110. Since the fishing line 150 is passed through the slot 114 and as long as the fishing line 150 passes all the way through the slot, at least two points of contact can be maintained between the fishing line 150 and the components 106, 108 of the knot tying device 100. The two points of contact can decrease the chance of slippage and increase a grip strength of the device 100.

Referring to FIGS. 4A-4D, detailed illustrations including a step-by-step guide for how to tie a "Davy Knot" using the knot tying device 100 are shown. As shown, the knot tying device 100 can be passed through and around a fishing line 150 to secure the fishing line to a fly lure 160. Of note, the illustrated steps are in sequential order for tying the Davy knot and each of the following described knots.

Referring to FIGS. 5A-5F, detailed illustrations including a step-by-step guide for how to tie an "Improved Clinch Knot" using the knot tying device 100 are illustrated. As shown, the knot tying device 100 can be passed through and around the fishing line 150 to secure the fly lure 160 to the fishing line 150. Typically, the fishing line 150 can be passed through an eyelet of the fly lure 160 and then an end of the fishing line 150 can be secured to the knot tying device 100.

Referring to FIGS. 6A-6E, detailed illustrations including a step-by-step guide for how to tie a "Non-Slip Loop" using the knot tying device 100 are illustrated. As shown, the knot tying device 100 can be easily attached to an end of the fishing line 150 after a loop has been made and the end is passed through an eyelet of the fly lure 160. The knot tying device 100 may then be passed around and through the fishing line 150 to create the Non-slip loop.

Referring to FIGS. 7A-7E, detailed illustrations including a step-by-step guide for how to tie an "Orvis Knot" using the knot tying device 100 are illustrated. As shown, the knot tying device 100 can be sized to pass through loops created with the fishing line 150 when tying a variety of knots. As previously mentioned, by implementing the knot tying device 100, an angler can consistently tie the Orvis knot in under 15 seconds. The knot tying device 100 can be implemented similar to a needle when sewing.

Referring to FIGS. 8A-8F, detailed illustrations including a step-by-step guide for how to tie a "Perfection Loop" using the knot tying device 100 are illustrated. As shown, the knot tying device 100 can be implemented to create the perfection loop with the fishing line 150. Of note, as shown in several illustrations, the knot tying device 100 can be weighted to pull the fishing line 150 when dropped but not heavy enough to damage the fishing line 150 when dropped. As can be appreciated, if the knot tying device 100 were too heavy, the fishing line 150 may become damaged when the knot tying device 100 is dropped. Alternatively, if the knot tying device 100 were too light, enough force may not be created to finish a knot when dropped.

Figure 9A:
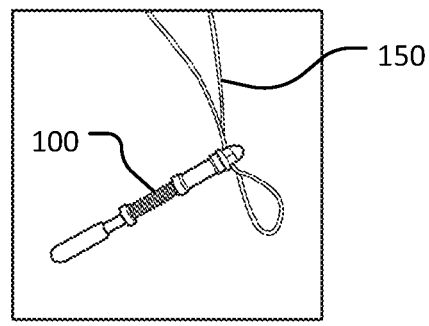
FIGS. 9A-9D include illustrative steps for tying a Surgeon's Knot with a knot tying device according to one embodiment of the present invention.
Figure 9B:
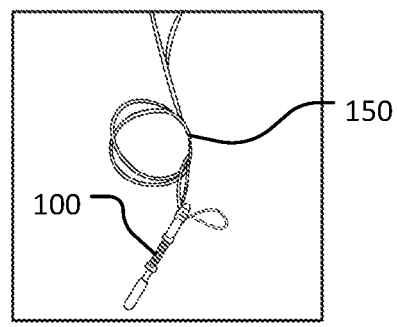
Figure 9C:
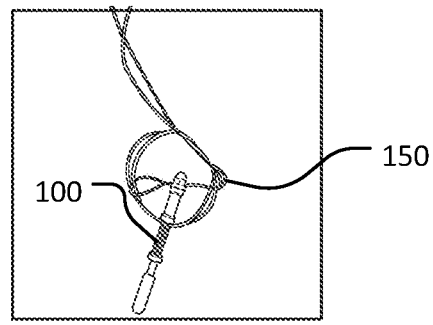
Figure 9D:
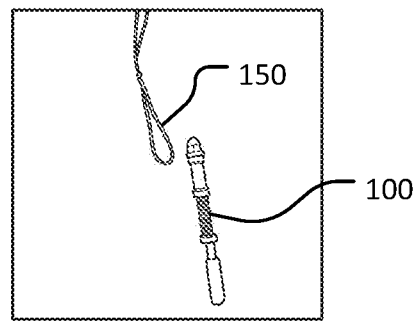
Figure 10A:
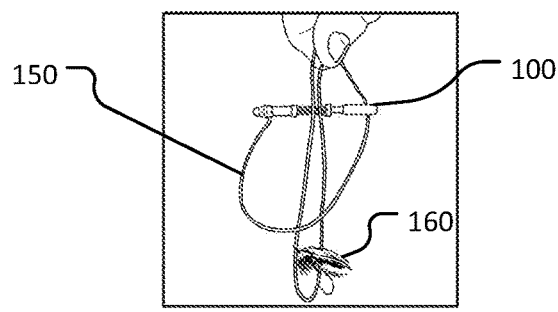
FIGS. 10A-10F include illustrative steps for tying a Uni Knot with a knot tying device according to one embodiment of the present invention.
Figure 10D:
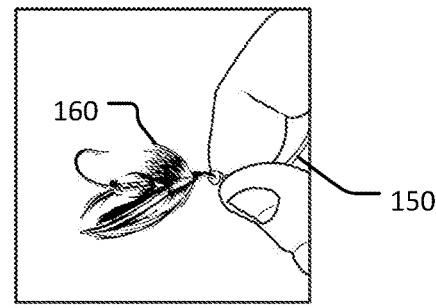
Figure 10B:
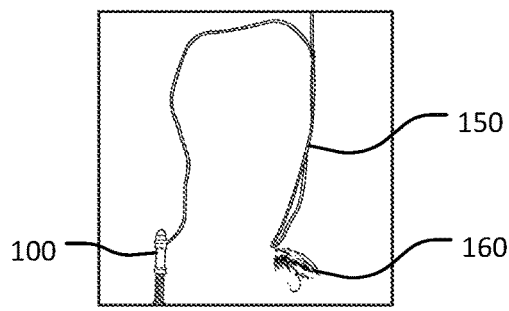
Figure 10E:
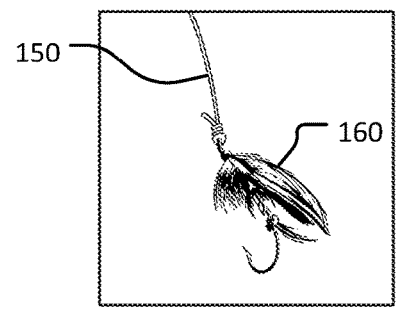
Figure 10C:
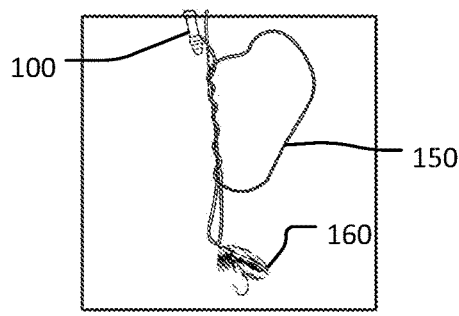
Figure 10F:
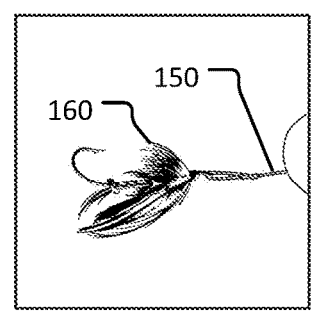

Referring to FIGS. 9A-9D, detailed illustrations including a step-by-step guide for how to a "Surgeon's Loop" using the knot tying device 100 are illustrated. As shown, the knot tying device 100 can be implemented to create various loops, including the Surgeon's loop, with the fishing line 150. Of note, a loop can be created with the fishing line 150 and then secured to the knot tying device 100, as shown in FIG. 9A. When the knot is completed, the loop can be released and no fishing line 150 may be wasted, as shown in FIG. 9D.

Referring to FIGS. 10A-10F, detailed illustrations including a step-by-step guide for how to tie a "Uni Knot" using the knot tying device 100 are illustrated. As shown, the knot tying device 100 can be wrapped around the fishing line 150 and passed through loops created in the fishing line 150 when tying the knot.

As shown generally in FIGS. 4A-10F, the knot tying device 100 can be implemented similar to a needle to simulate sewing knots by passing the knot tying device 100 through and around the fishing line 160. Of significant note, the knot tying device 100 can be secured a plurality of differently weighted fishing lines. The knot tying device 100 can be used with up to 50 lb. monofilament and fluorocarbon fishing lines, up to 200 lb. braided line, and any fly line up to 15 weight line. As previously mentioned, the knot tying device 100 can be implemented to tie a variety of different knots. The knot tying device 100, and the subsequently described second embodiment knot tying device 200, can be implemented to tie at least a Clinch knot, an Improved clinch knot, an Orvis knot, an Orvis tippet knot, a Double Surgeon's knot, a Triple Surgeon's knot, a Nail knot, a Uni knot, a Double Uni knot, a Blood knot, a Perfection loop, a Baja knot, a Non-slip loop knot, an Albright knot, a Trilene knot, a San Diego jam knot, a Braid knot, a Davy knot, a J knot, a Dropper loop knot, and more.

A Second Embodiment of a Knot Tying Device

Referring to FIGS. 11A-11D, detailed diagrams of a second embodiment 200 of a knot tying device is illustrated. The knot tying device 200 can be implemented to aid an angler in tying a plurality of different knots while fishing. The knot tying device 200 can be easily stored and is small enough to easily thread through various fishing lines while tying a knot. The second embodiment knot tying device 200 can include components similar to the first embodiment knot tying device 100. The second embodiment knot tying device 200 may not include a slot similar to the slot 114 of the first embodiment knot tying device 100. A shaft of the second embodiment knot tying device 200 may be implemented with the first embodiment knot tying device 100 and modified to include a slot.

As shown generally in FIGS. 11A-11D, the knot tying device 200 can include, but is not limited to, a shaft 202, a spring 204, a slide member 206, an elastomeric member 208, an end stop 210, and a shaft stop 212. The spring 204 may be passed over a top end of the shaft 202 and slide down the shaft 202 to the shaft stop 212. The slide member 206 may then be passed over the top end of the shaft 202 and slide down to the spring 204. The elastomeric member 208 may then be passed over the top end of the shaft 202. In one embodiment, the end stop 210 may be a nut threadably coupled to an end of the shaft 202. Of note, the spring 204 will typically need to be slightly compressed to fit each of the components onto the shaft 202 before the nut 210 is coupled to the top end. Generally, a combined length of the spring 204 and the slide member 206 can be greater than a length of the shaft 202 from the shaft stop 212 to the top end. This can help ensure that the spring 204 is compressed when the knot tying device 200 is assembled to provide a constant force against the elastomeric member 208.

Referring to FIG. 11A, the slide member 206 is shown in a first position. Similar to the first embodiment knot tying device 100, the second embodiment knot tying device 200 can be in a static state in the first position.

Figure 11C:
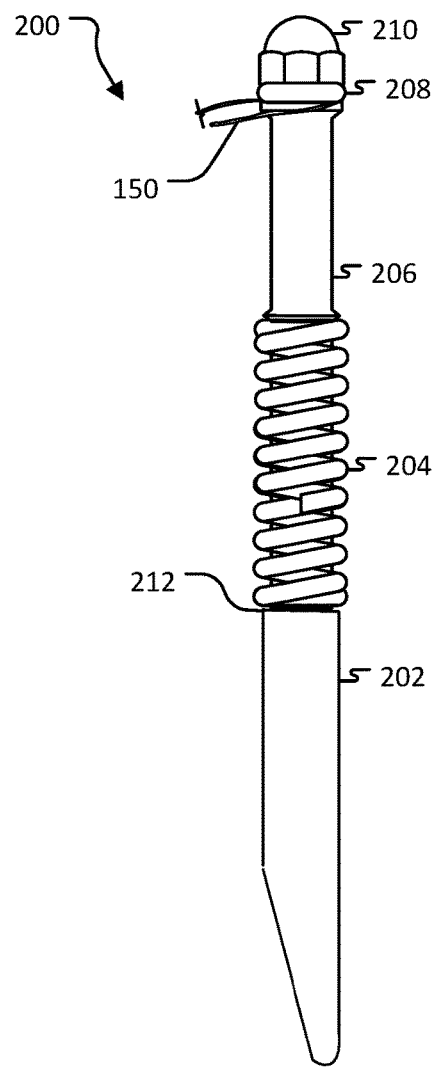
FIG. 11C is a side view of a fishing line being sandwiched between a slide member and an elastomeric member a knot tying device according to one embodiment of the present invention.

Referring to FIG. 11B, the slide member 206 is shown in a second position. When in the second position, a fishing line 150 can be partially wrapped around the shaft 202, as shown in FIG. 11B. When the slide member 206 is moved back to the first position, as shown in FIG. 11C, the fishing line 150 can be trapped between the slide member 206 and the elastomeric member 208. Typically, the fishing line 150 can be partially wrapped around the shaft 202 to provide a better grip by the knot tying device 200. By partially wrapping the fishing line 150 around the shaft 202, multiple points of contact can be made between the fishing line 150 and the slide member 206 and the elastomeric member 208 of the knot tying device 200.

Referring to FIG. 11C, a side view of the fishing line 150 being coupled to the knot tying device 200 is illustrated. As shown, the fishing line 150 can be sandwiched between the slide member 206 and the elastomeric member 208. As can be appreciated, the fishing line 150 can be wrapped around the shaft 202 when the slide member 206 is lowered down in the second position, and then the slide member 206 can be released and the fishing line 150 can be sandwiched between the top of the slide member 206 and a bottom of the elastomeric member 208 in the first position.

In some embodiments, the elastomeric member 208 may be coupled to the nut 210. In other embodiments, the elastomeric member 208 may be coupled to a top end of the slide member 206. In one example, the elastomeric member 208 can be adhesively coupled to the slide member 206 or the nut 210. It is to be appreciated that other means of coupling the elastomeric member 208 to the slide member 206 or the nut 210 are contemplated and not outside a scope of the present invention. Although the fishing line 150 is shown trapped between the slide member 206 and the elastomeric member 208, it is be appreciated that the fishing line 150 can be trapped between the elastomeric member 208 and the nut 210 in embodiments where the elastomeric member 208 is coupled to the slide member 206.

Figure 11D:
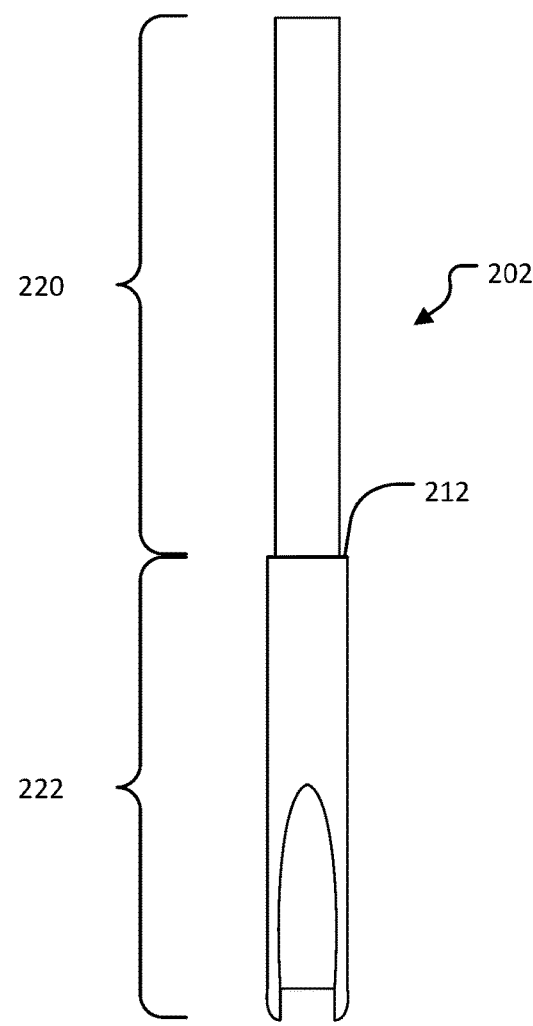
FIG. 11D is a side view of a shaft of a knot tying device according to one embodiment of the present invention.

Referring to FIG. 11D, a front view of the shaft 202 is illustrated. As shown, the shaft stop 212 can be formed from a top of a bottom portion 222 of the shaft 202 which has a larger diameter than a top portion 220 of the shaft 202. In such an embodiment, the shaft 202 can typically be machined from a single piece of material to the desired dimensions. Embodiments are contemplated where the shaft 202 is manufactured substantially similarly to the first embodiment shaft 102. Similar to the first embodiment knot tying device 100, the second portion 222 of the shaft 202 may include a forked end with a grooved ramp between the forks.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A knot tying device comprising:
   a shaft being defined by a first end, a second end, a first portion including the first end, a second portion including the second end, and a shaft stop located between the first portion and the second portion;
   a compression spring fit over the first portion and having a bottom end interfacing with a top of the shaft stop;
   a slide member fit over the first portion and having a bottom end interfacing with a top end of the compression spring;
   an elastomeric member fit over the first portion and having a bottom end interfacing with a top end of the slide member; and
   an end stop coupled to the first end of the shaft and having a bottom end interfacing with a top end of the elastomeric member.

2. The knot tying device of claim 1, wherein the first portion of the shaft includes a slot for receiving a fishing line therethrough.

3. The knot tying device of claim 2, wherein the slot is covered by the slide member when the slide member is in a first position.

4. The knot tying device of claim 3, wherein the slot is at least partially uncovered by the slide member when the slide member is in a second position.

5. The knot tying device of claim 4, wherein the compression spring is further compressed when the slide member moves from the first position to the second position.

6. The knot tying device of claim 1, wherein the compression spring exerts an upward force on the slide member.

7. The knot tying device of claim 1, wherein the slide member and the elastomeric member are adapted to interface with a fishing line.

8. The knot tying device of claim 1, wherein a diameter of the first portion is substantially equal to the diameter of the second portion.

9. The knot tying device of claim 1, wherein the second portion includes a forked end with a ramped groove between the fork.

10. A knot tying device comprising:
    a shaft being defined by a first portion having a first diameter, a second portion having a second diameter, and a slot located in an upper section of the first portion;
    a compression spring fit over the first portion and having a bottom end interfacing with a top of the second portion;
    a slide member fit over the first portion and having a bottom end interfacing with a top end of the compression spring;
    an elastomeric member fit over the first portion and having a bottom end interfacing with a top end of the slide member; and
    a nut removably coupled to a top end of the shaft and having a bottom end interfacing with a top end of the elastomeric member.

11. The knot tying device of claim 10, wherein a bottom end of the shaft is defined by a forked end with a ramped groove between the fork.

12. The knot tying device of claim 11, wherein an end of the ramped groove proximate the end of the shaft is perpendicular to a longitudinal axis of the shaft.

13. The knot tying device of claim 10, wherein the slide member is adapted to slide down the first portion of the shaft and compress the compression spring.

14. The knot tying device of claim 10, wherein a fishing line is (i) adapted to be passed through the slot when the slide member is moved down, and (ii) sandwiched between the top of the slide member and the bottom of the elastomeric member when the slide member is released.

15. The knot tying device of claim 10, wherein the elastomeric member is coupled to a bottom of the nut.

16. The knot tying device of claim 10, wherein the nut is a cap nut.

17. A method of implementing a knot tying device, the method comprising:
    providing a knot tying device, the knot tying device comprising:
      a shaft being defined by a first portion, a second portion, a shaft stop located between the first portion and the second portion, and a slot located in an upper section of the first portion;
      a compression spring fit over the first portion and having a bottom end interfacing with a top of the shaft stop;
      a slide member fit over the first portion and having a bottom end interfacing with a top end of the compression spring;
      an elastomeric member fit over the first portion and having a bottom end interfacing with a top end of the slide member; and
      a nut removably coupled to a top end of the shaft and having a bottom end interfacing with a top end of the elastomeric member;
    moving the slide member from a first position to a second position;
    inserting a fishing line through the slot;
    moving the slide member from the second position back to the first position and trapping the fishing line between the slide member and the elastomeric member; and
    using the knot tying device to tie a knot with the fishing line.

18. The method of claim 17, wherein in the (i) first position, the slide member is pressed against the elastomeric member; and (ii) second position, the slide member is moved down the shaft revealing at least a portion of the slot.

19. The method of claim 17, wherein the knot couples the fishing line to a lure.

20. The method of claim 17, wherein the knot tying device passes through and around the fishing line when tying the knot.

* * * * *